United States Patent [19]

Ivanov et al.

[11] Patent Number: 5,457,810
[45] Date of Patent: Oct. 10, 1995

[54] MOBILE SPEED SENSITIVE HAND OVER METHOD IN HIERARCHIAL CELL STRUCTURES

[75] Inventors: Kolio Ivanov; Egon Schulz, both of Munich, Germany

[73] Assignee: Siemens Aktiengesellschaft, Munich, Germany

[21] Appl. No.: 195,773

[22] Filed: Feb. 14, 1994

[51] Int. Cl.$^6$ ................................................. H04B 7/26
[52] U.S. Cl. ............................................ 455/33.2; 379/60
[58] Field of Search ....................... 455/33.1, 33.2, 455/33.4, 54.1, 54.2, 56.1; 379/60, 59

[56] References Cited

U.S. PATENT DOCUMENTS

| | | | |
|---|---|---|---|
| 5,161,248 | 11/1992 | Bertiger et al. | 455/33.2 |
| 5,189,734 | 2/1993 | Bailey et al. | 379/60 |
| 5,265,263 | 11/1993 | Ramsdale et al. | 379/60 |
| 5,278,991 | 1/1994 | Ramsdale et al. | 455/33.2 |
| 5,345,499 | 9/1994 | Benveniste | 379/60 |

FOREIGN PATENT DOCUMENTS

| | | |
|---|---|---|
| 0369535 | 5/1990 | European Pat. Off. . |
| 0562743 | 9/1993 | European Pat. Off. . |
| 0063242 | 4/1983 | Japan ............ 455/33.4 |
| 0010135 | 5/1987 | Japan ............ 455/33.4 |
| 0196772 | 8/1991 | Japan ............ 455/33.4 |
| 2242806 | 10/1991 | United Kingdom . |

Primary Examiner—Chi H. Pham
Assistant Examiner—Mark D. Wisler
Attorney, Agent, or Firm—Hill, Steadman & Simpson

[57] ABSTRACT

In a speed-dependent hand over method for hierarchic cell structures, a finding is made to whether mobile stations have traversed a radio coverage domain of a micro cell within a time interval. When the mobile stations are still in the radio coverage domain with respect to the micro cell after the time interval, then a hand over for the appertaining mobile stations into the micro cell is requested.

13 Claims, 8 Drawing Sheets

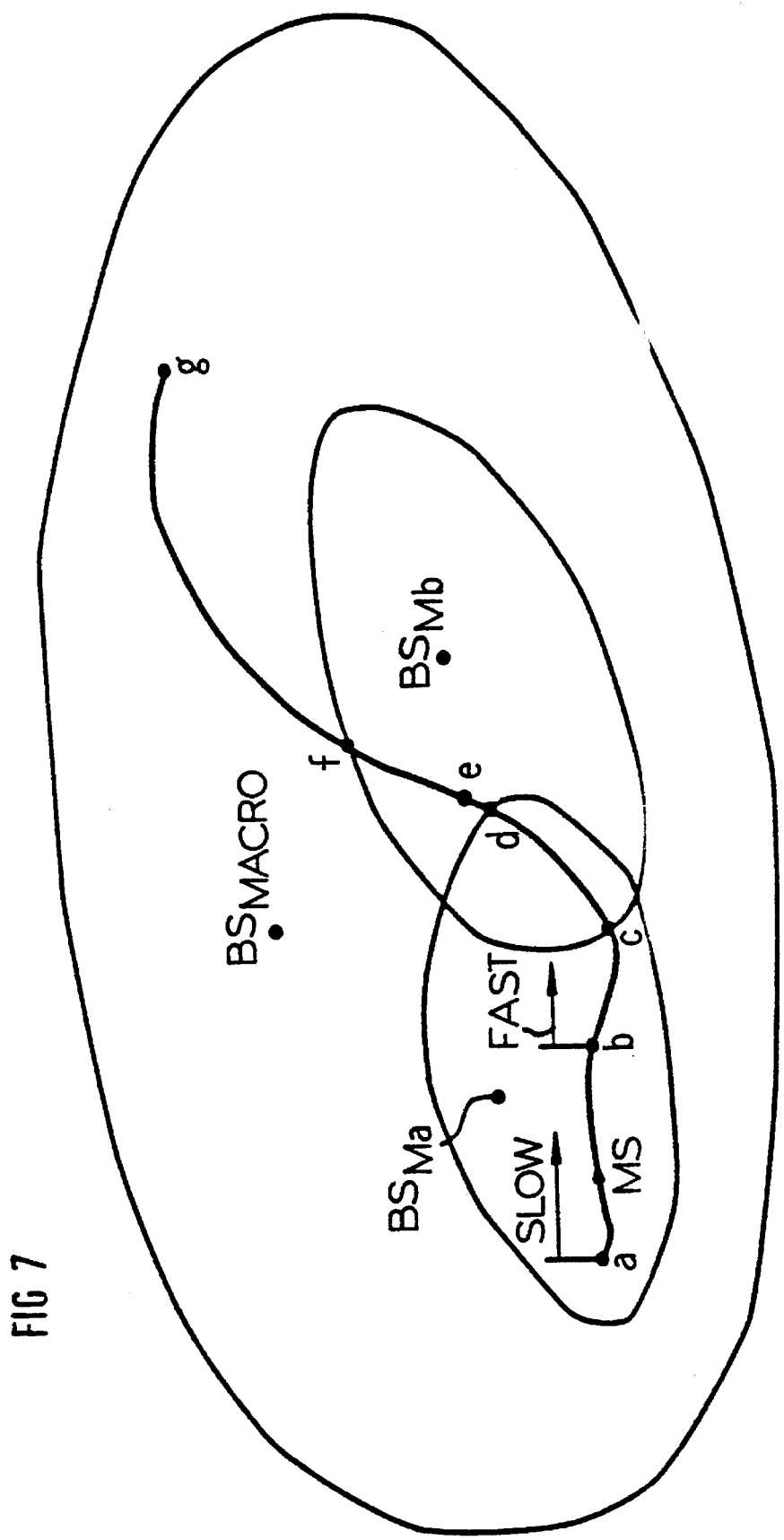

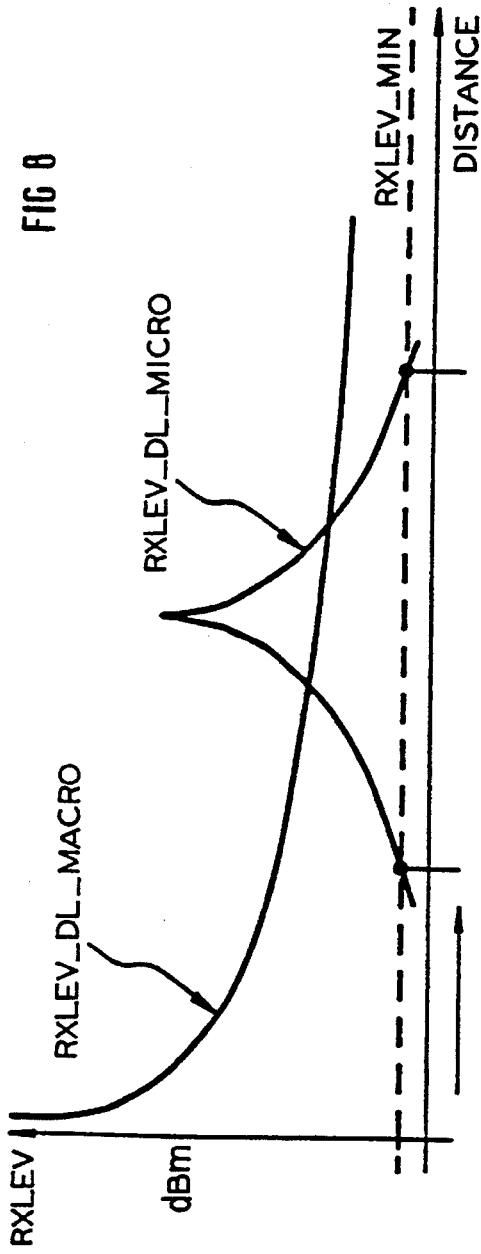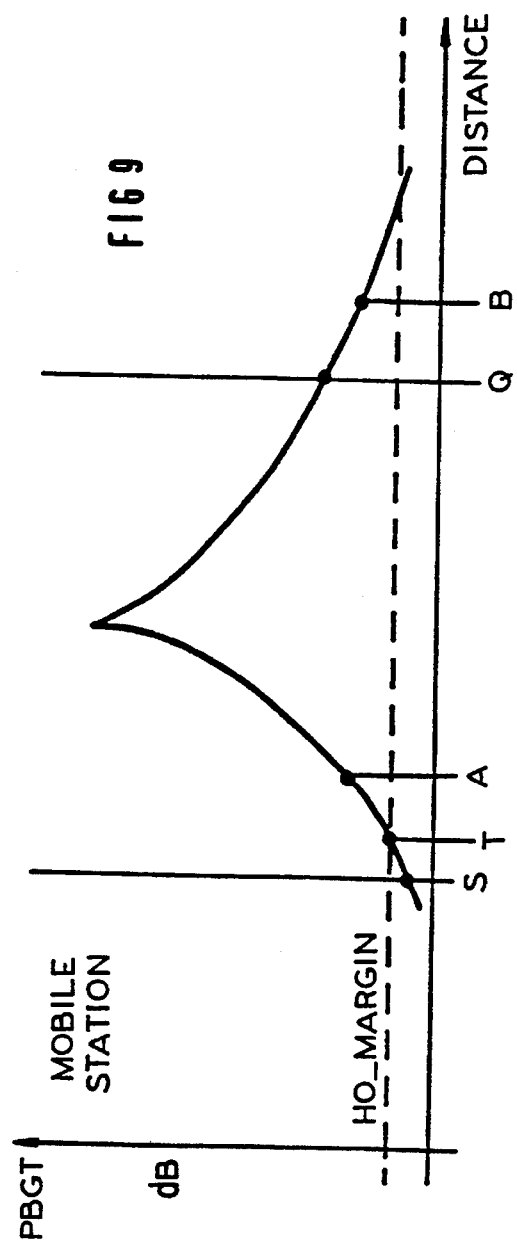

MOBILE SPEED SENSITIVE HAND OVER METHOD IN HIERARCHIAL CELL STRUCTURES

BACKGROUND OF THE INVENTION

The present invention is directed to a mobile radio network having a plurality of base stations in a spatial arrangement in the fashion of a cellular system in a hierarchic cell structure, composed of a macro cell and of at least one micro cell.

The hand over from the radio management domain of one cell into that of a neighboring cell can be initiated for various reasons. For example, hand over reasons can be that the received level has fallen below a certain threshold, the quality (bit error rate—BER) is too poor, the distance to the administering base station has become too great, because of excessively high interference, because of the power budget of a better cell or for traffic reasons as well. These are thereby a matter of what are referred to as static hand over decisions, i.e. the data measured by the mobile station and/or base station, namely level, quality, distance, etc., or the quantities derived from the measured data are compared, upon utilization of a filter, for example by averaging the measured data, to chronologically constant thresholds that can be administered by O & M (operation and maintenance).

In order to have both channel capacities in regions having high subscriber densities as well as an adequate supply available between regions of high subscriber density, a switch shall be made to mixed or hierarchic cell structures composed of small cells (micro cells) which are in turn integrated in a large cell (macro cell, also referred to as umbrella cell). FIG. 1 shows such a structure. A plurality of micro cells MC1, MC2, MC3 having the base stations BS1, BS2, BS3 are thereby arranged within a macro cell having the base station BS. There are four types of hand over for a mobile station that moves in such a mixed cell system, namely from the macro cell to another macro cell, from the macro cell to a micro cell, from one micro cell to another micro cell as well as from the micro cell to a macro cell. The radius of the micro cells will thereby be extremely small and usually amount to only a few hundred meters. Slowly moving mobile radio telephone users are to be supplied by the micro cells; the macro cells (umbrella cells), by contrast, are intended to assure the radio management of rapidly moving mobile stations.

By joining micro cells which are integrated in the macro cell to one another, there is the possibility that a rapidly moving mobile station that is allocated to the base station of the macro cell and travels into the radio management [or: coverage] domain of a micro cell located in the macro cell is allocated to the base station of the micro cell on the basis of static hand over decisions. Since the mobile station moves very rapidly and the micro cell has a small diameter, the mobile station will in turn rapidly leave the micro cell and a new hand over is pending. Either a hand over for the mobile station into the original macro cell or into the adjoining micro cell will thereby be requested when a further micro cell adjoins the micro cell that has been traversed. FIG. 2 shows such a scenario of a mobile station in a hierarchical cell structure that can be arbitrarily continued. A series of micro cells having the base station $BS_{Ma}$, $BS_{Mb}$, $BS_{Mc}$, $BS_{Md}$, $BS_{Me}$ and $BS_{Mf}$ are thereby integrated within a macro cell having the base station $BS_{Macro}$. A mobile station MS moves along a travel path from point a to point g via the points b, c, d, e and f that lie in the edge region of a few micro cells. The mobile station is thereby first allocated to the macro cell having the base station $BS_{Macro}$ and sets up a call. It then travels into the radio coverage domain of the micro cell having the base station $BS_{Ma}$. The hand over decision process requests a hand over for the mobile station into the micro cell having the base station $BS_{Ma}$. The mobile station MS then travels into the radio coverage domain of the micro cell having the base station $BS_{Mb}$. The hand over decision process requests a hand over for the mobile station into the micro cell having the base station $BS_{Mb}$. After this, the mobile station leaves the radio coverage domain of the micro cell having the base station $BS_{Mb}$. The hand over decision process now requests a hand over for the mobile station into the macro cell having the base station $BS_{Macro}$. The further micro cells lie outside the travel path of the mobile station, so that the hand over decision process only requests a hand over for the mobile station into the micro cell having the base station $BS_{Mf}$ when the mobile station travels into the radio coverage domain of the micro cell having the base station $BS_{Mf}$. When the radio coverage domain of the micro cell having the base station $BS_{Mf}$ is left, the hand over decision process requests a hand over for the mobile station into the macro cell having the base station $BS_{Macro}$. The mobile station ends the call and remains allocated to the macro cell having the base station $BS_{Macro}$. All this requires a high signaling outlay. It can also be stated that the continuous hand over from one micro cell to another can lead to a loss of the call given a slow execution of the hand over decisions, for example given a great averaging length of the measured data.

The speed of the mobile radio telephone subscriber is not taken into consideration in prior methods for deciding a hand over for a mobile station. The hand over methods are based on static hand over decisions, i.e. the data measured by the mobile station and/or base station or quantities derived from measured data are supplied to the hand over decision process upon utilization of a filter. In this decision process, the filtered data are compared to permanently set thresholds or are compared to chronologically constant thresholds that can be administered by O & M. When the filtered data downwardly or upwardly transgress the appropriate thresholds, then a hand over is requested for the appertaining mobile station.

SUMMARY OF THE INVENTION

It is an object of the present invention to reduce the plurality of hand overs for rapidly moving mobile stations in such a mixed cell structure.

In a mobile radio network of the type initially set forth, this object is inventively achieved by a hand over from the radio coverage domain of a macro cell into one or more further micro cells that takes the speed of a mobile radio subscriber into consideration and is implemented in addition to the static hand over decisions, being carried out such that a determination is made in the hand over decision process for a mobile station allocated to the base station of the macro cell, by comparison of the measured data about level, quality, distance and the like and/or of the quantities derived from the measured data that are calculated by the mobile station and/or by the base station to thresholds, as to whether it is located in the radio coverage domain of the micro cell contained in the macro cell or approaches this and, given a positive result, a means for time acquisition (timer) having an arbitrary but fixed time interval is started during which a determination is continuously made on the basis of the measured data arriving in the hand over decision process as to whether the mobile station is still located in the radio coverage domain of the micro cell; and such that, after expiration of the time interval, a hand over for the appertaining mobile station into the micro cell is requested in that case wherein it is still located in the radio coverage domain of the micro cell and no hand over is requested for that case wherein the mobile station is no longer located in the radio coverage domain of the micro cell.

In this speed-sensitive hand over method for hierarchic cell structures, a check is carried out to see whether the mobile stations have traversed the radio coverage domain of a micro cell within a time interval. When the mobile stations are still located in the radio coverage domain with respect to the micro cell after the time interval, i.e. after the expiration of a timer, then a hand over for the appertaining mobile stations into the micro cell is requested.

Further developments of the present invention are as follows.

The timer is reset when, on the basis of the measured data entering in the hand over decision process, it is found within the time interval that the mobile station is no longer located in the radio coverage domain of the micro cell. The timer is started again when it is found in the hand over decision process that the mobile station is again located in the radio coverage domain of a micro cell.

The steps of the method are executed when the mobile station is allocated to the base station of a micro cell of a hierarchic cell structure and approaches an adjoining micro cell. The timer is stopped and reset after a successful hand over.

The time interval to be monitored is longer than or equal to the measuring period for the evaluation of the reception data entering in the hand over decision process.

A monitoring timer is provided between the resetting of the timer and the restarting of the timer for one and the same connection, this monitoring timer being started when the timer is reset and effecting that the timer can only be started again after the run-down of the monitoring timer in case the mobile station is located in the radio coverage domain of a micro cell. The timer and/or monitoring timer are implemented as counters.

One timer is administered per neighboring cell.

The respective timer interval to be set forms a measure for the dwell time of the mobile station in the micro cell to be anticipated in accord with the vehicle speed.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

Partial illustrations in FIGS. 3–7 thereby show various versions for a mobile station moving with different speed within a macro cell and micro cells integrated therein, the hand over procedure being explained with reference to the appertaining versions; and FIGS. 8 and 9 depict functional behavior of the hand over decision process of the present invention.

DESCRIPTION OF THE PREFERRED EMBODIMENTS

Figure 1:
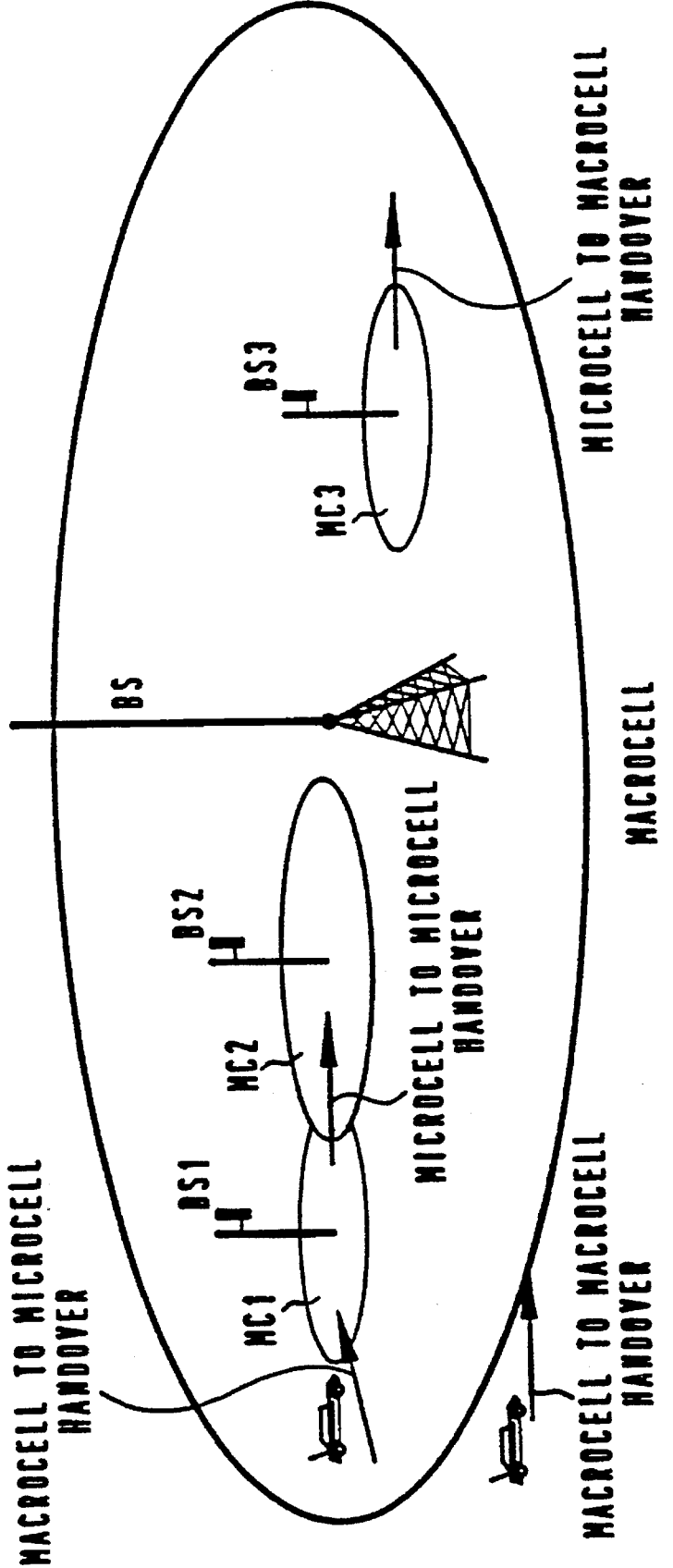
FIGS. 1 and 2 depict prior art mobile radio networks showing micro cells.
Figure 2:
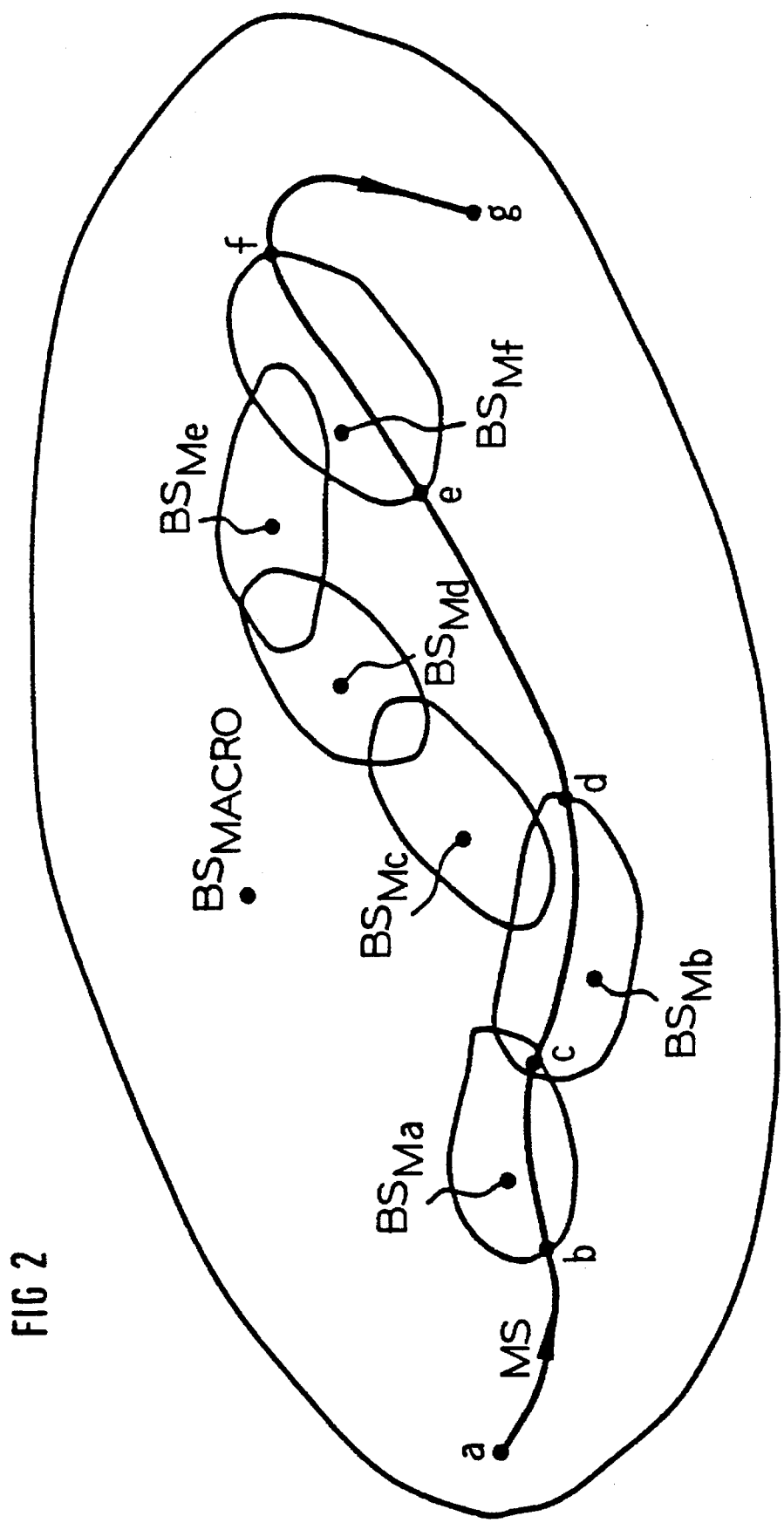

It is important to the present invention given the method disclosed here for decision finding of a hand over of a mobile station in a hierarchic cell structure composed of a macro cell and at least one or more micro cells that the speed of the appertaining mobile station is taken into consideration in addition to the static hand over decisions. The integration of the speed of the mobile stations or, respectively, of the mobile telephone subscribers can be realized in all mobile radio systems wherein measured data such as, for example, received level, quality, distance, etc., from the mobile station and/or base station and/or quantities derived from these measured data are supplied to the hand over decision process in arbitrary but fixed time intervals. In the GSM system, measured data and/or quantities derived from the measured data are generally communicated to the hand over decision process in $T_{SACCH}$ intervals or a multiple thereof. A $T_{SACCH}$ interval amounts to approximately 480 msec.

It is provided as initial situation that a mobile station is located in a hierarchically arranged cell structure composed of a macro cell and at least one or more micro cells, and that the mobile station is allocated to the base station of the macro cell. By comparing the measured data calculated by the mobile station and/or the base station and/or quantities derived from the measured data to thresholds, a finding is made in the hand over decision process as to whether the mobile station is located in the radio coverage domain of the micro cell contained in the macro cell or whether it is approaching the radio coverage domain of the micro cell contained in the macro cell. When this is the case, then a timer $T_{HO}$ is started in the hand over decision process. The timer or, respectively, the time interval to be monitored is thereby selected such that it is greater than or equal to a measuring period of the measured data arriving in the hand over decision process. Consequently, the time interval to be monitored should be a multiple of $T_{SACCH}$ for the GSM system.

During the running of the timer $T_{HO}$ or, respectively, during the arbitrary but fixed time interval, a decision as to whether the mobile station is still located in the radio coverage domain of the micro cell is made on the basis of the measured data from the mobile station and/or base station arriving in the hand over decision process and/or on the basis of the quantities derived from the measured data.

When a finding is made in the hand over decision process that the mobile station is still situated in the radio coverage domain of the micro cell after the expiration of the timer or, respectively, after the time interval, then a hand over is requested for the appertaining mobile station into the micro cell. This applies to both versions of FIGS. 3 and 4, the one thereof showing the hand over procedure for a slow mobile station for which the timer expires shortly after the radio coverage domain of the micro cell is reached and a hand over into the micro cell is therefore requested and successfully implemented, and the other thereof showing [the hand over procedure] for a mobile station having moderate speed which covers a greater distance in the micro cell within the time interval and whereby the timer runs out before the radio coverage domain of the micro cell is left and a hand over into the micro cell is therefore requested for the mobile station and successfully implemented.

Figure 3:
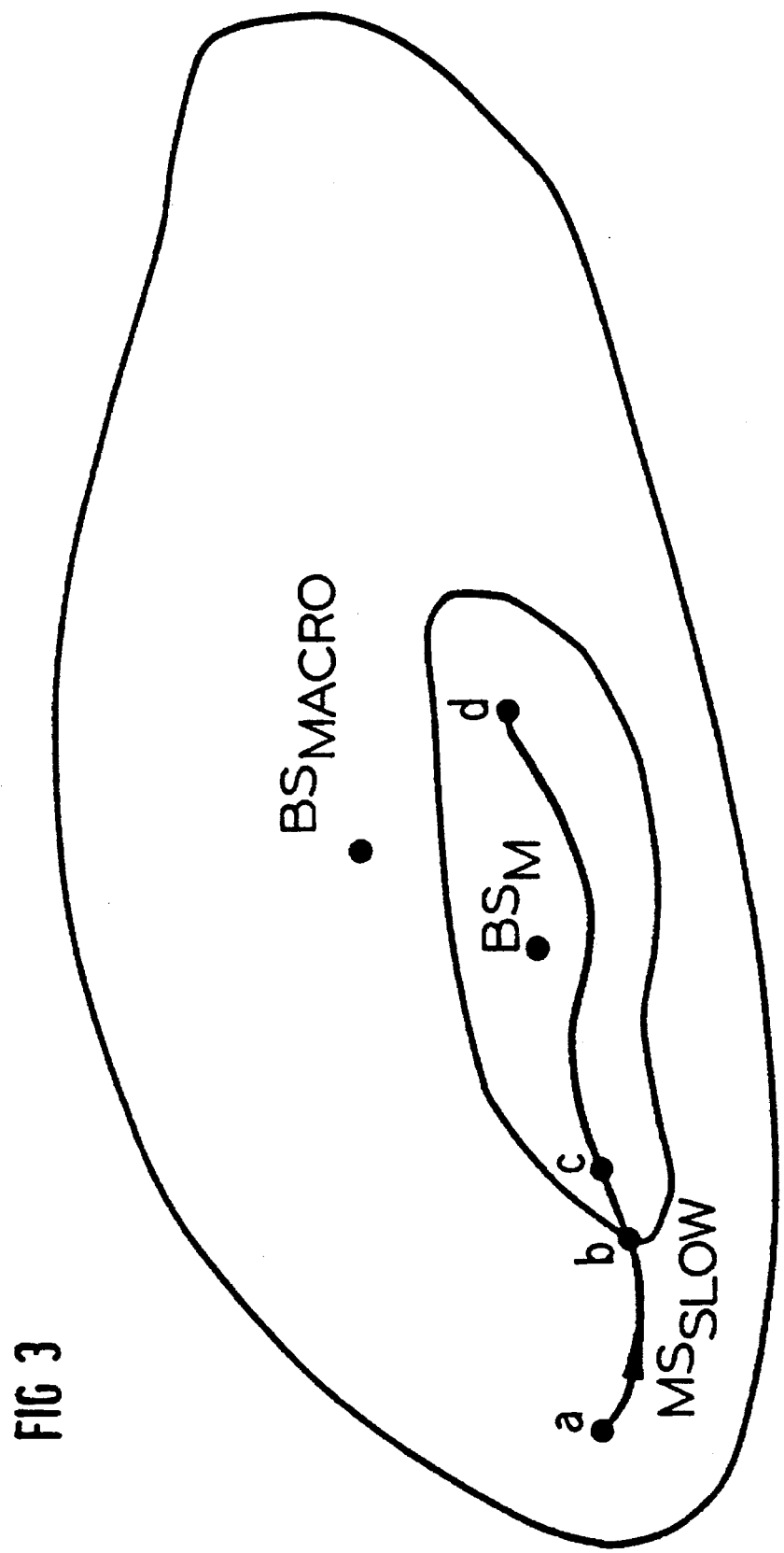

In the exemplary embodiment of FIG. 3, a slow mobile station MS starting from point a is allocated to the macro cell having the base station $BS_{Macro}$ and sets up a call. At point b, the mobile station MS reaches a micro cell having the base station $BS_M$ that is integrated in the macro cell. The mobile station MS is located in the radio coverage domain of the micro cell and the hand over decision process starts the timer $T_{HO}$. It is assumed that the timer $T_{HO}$ has rundown when the mobile station MS has reached the point c not far from b. Since the mobile station MS is still located in the radio coverage domain of the micro cell having the base station $BS_M$, a hand over into the micro cell is requested. When point d is reached, this likewise being located within the micro cell, the mobile station MS ends the call in the micro cell and proceeds into idle mode.

Figure 4:
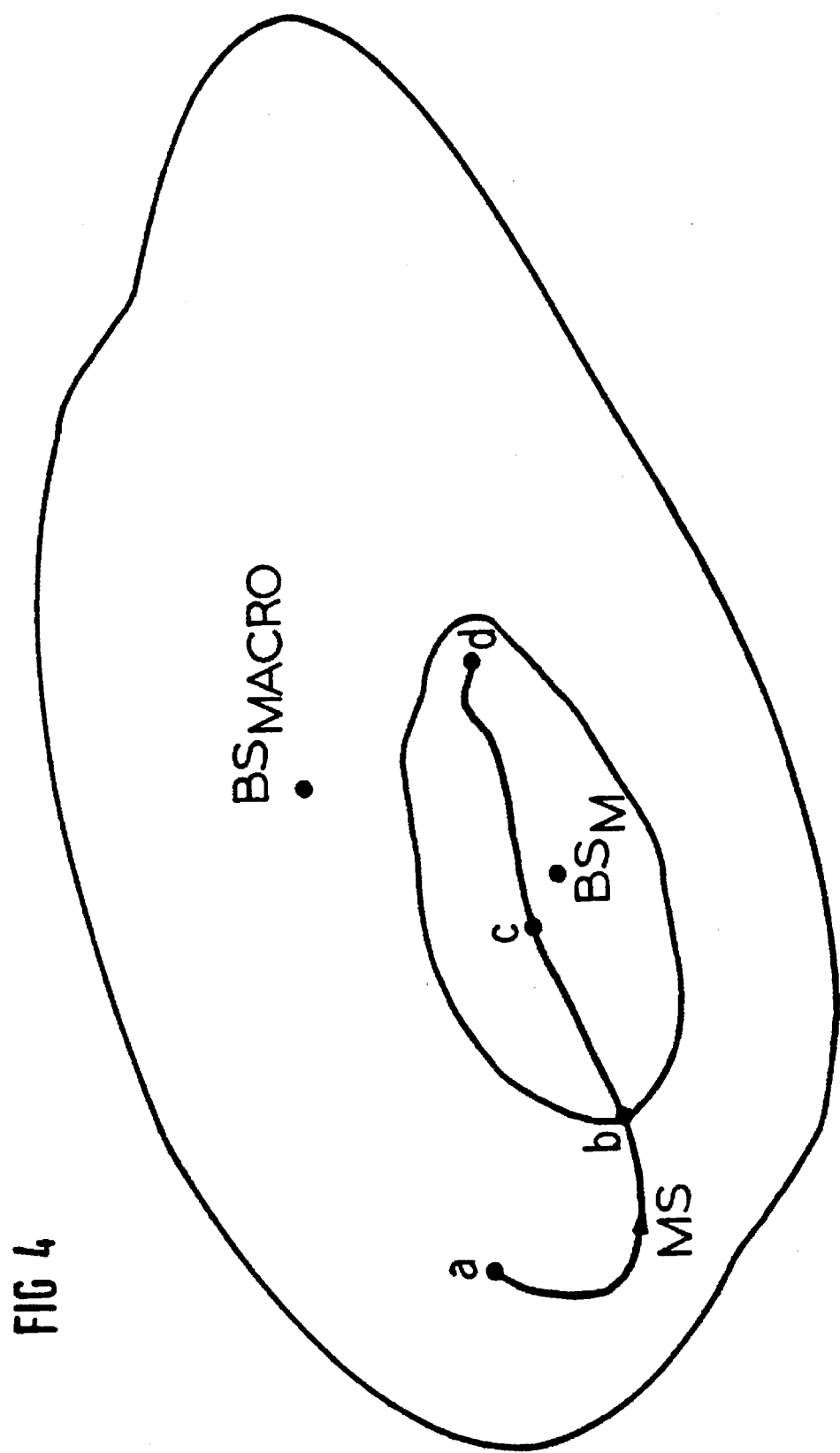

A mobile station MS of moderate speed is assumed in the exemplary embodiment of FIG. 4, this being allocated to the macro cell having the base station $BS_{Macro}$ and setting up a call. When the mobile station MS travels into the radio coverage domain of the micro cell having the base station $BS_M$ (point b), the hand over decision process starts the timer $T_{HO}$. Since the mobile station is still located in the radio coverage domain of the micro cell having the base station $BS_M$ after expiration of the timer $T_{HO}$ at point c, a hand over into the micro cell is requested. The mobile station MS thereby also ends the call at point d within the micro cell and proceeds into idle mode.

Figure 5:
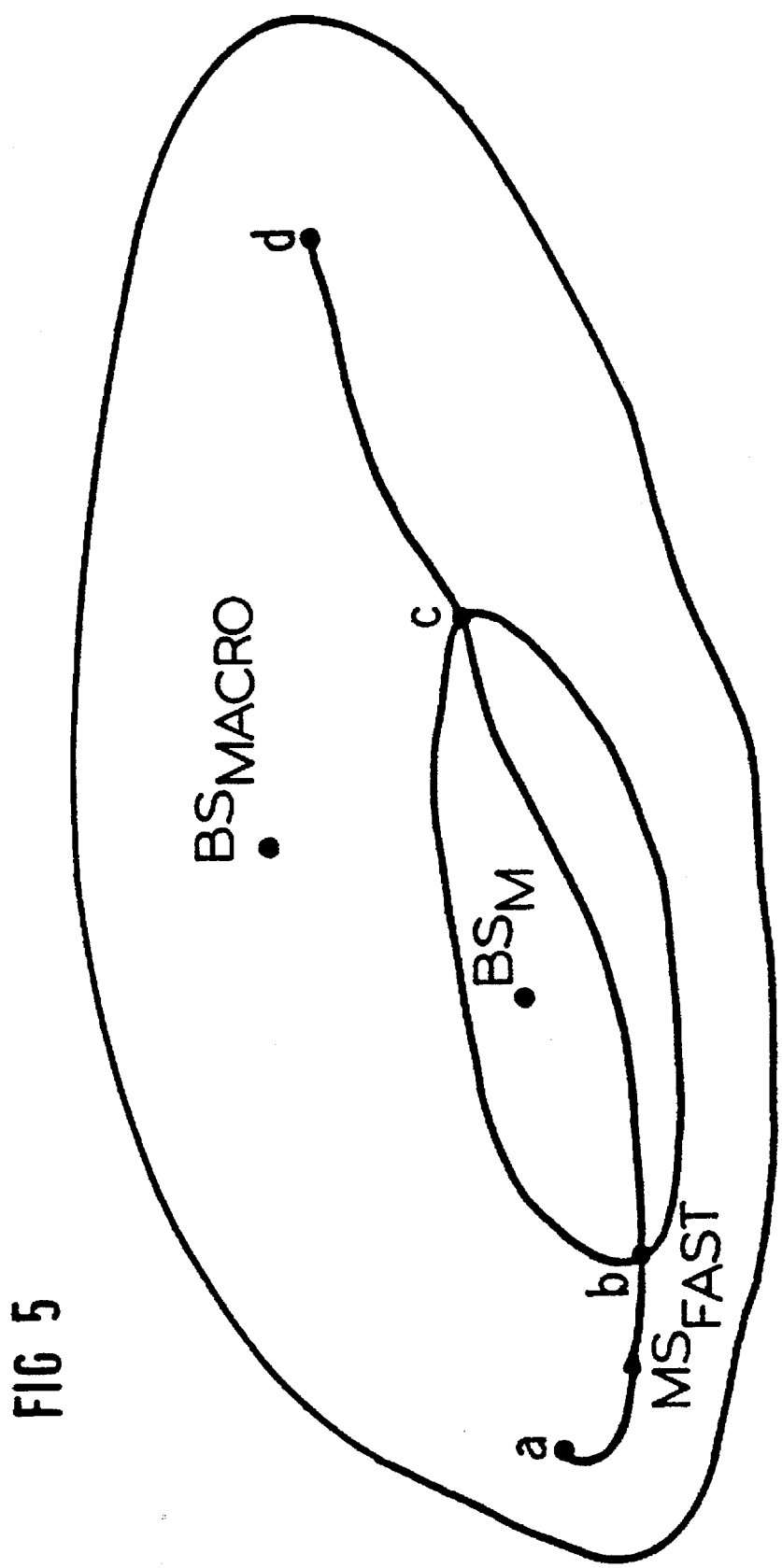

When, by contrast, it is found in the hand over decision process that the mobile station is no longer located in the radio coverage domain of the micro cell before expiration of the timer or, respectively, before the time interval, then a hand over for the appertaining mobile station into the micro cell is not requested. FIG. 5 shows that case wherein a fast mobile station MS is allocated to the macro cell having the base station $BS_{Macro}$ and sets up a call. The mobile station travels into the radio coverage domain of the micro cell having the base station $BS_M$ in point b and the hand over decision process starts the timer $T_{HO}$. The fast mobile station MS leaves the radio coverage domain of the micro cell having the base station $BS_M$ in point c before the expiration of the timer $T_{HO}$. The timer $T_{HO}$ is stopped, reset and is not started again since the mobile station MS is no longer situated in the radio coverage domain of the micro cell. The fast mobile station MS remains allocated to the macro cell having the base station $BS_{Macro}$. The mobile station MS ends the call in this macro cell and proceeds into the idle mode.

Figure 6:
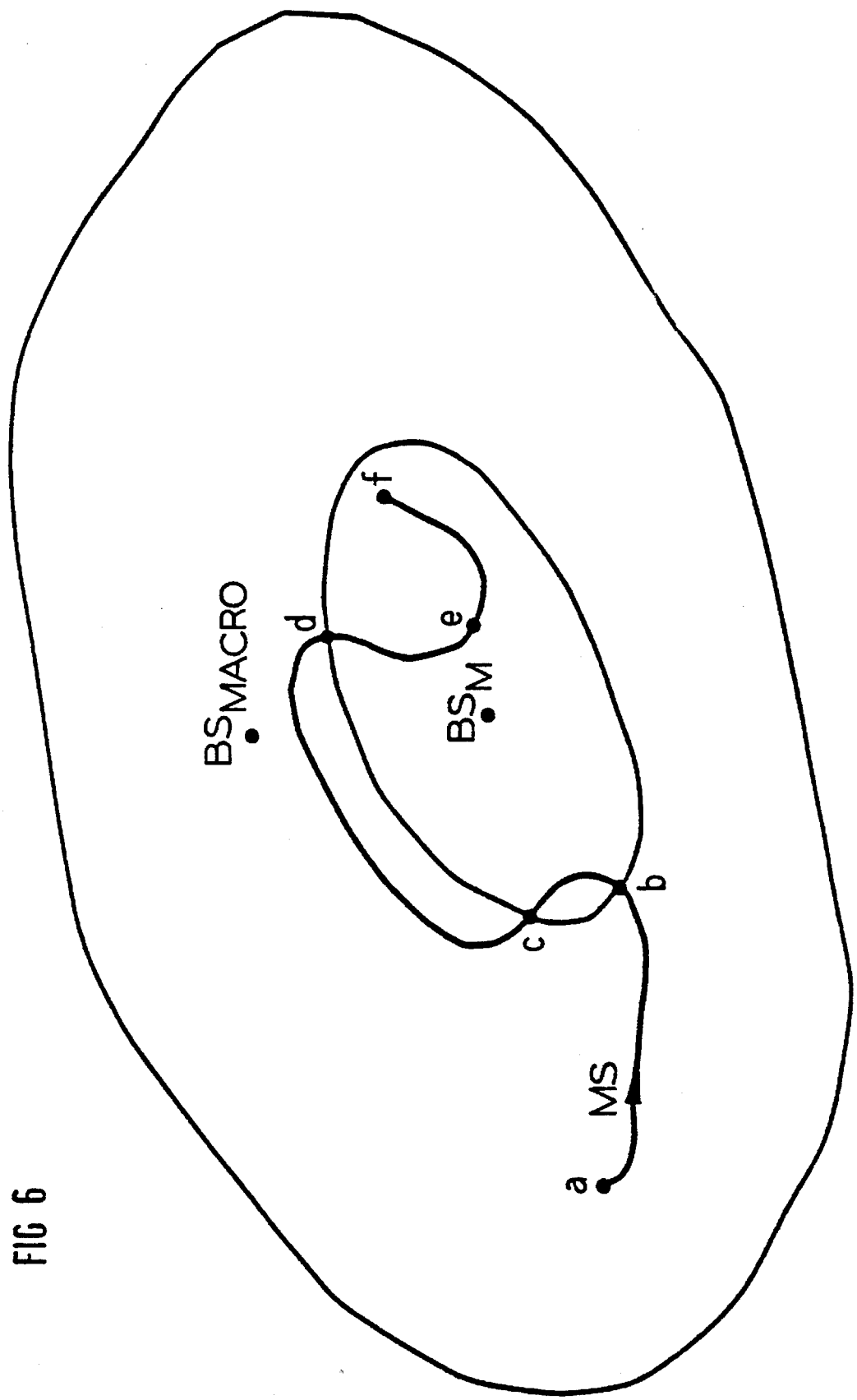

When, on the basis of the measured data entering in the hand over decision process from the mobile station and/or base station and/or on the basis of the quantities derived from the measured data, it is found before the run-down of the timer or, respectively, within the time interval that the mobile station is no longer located in the radio coverage domain of the micro cell, then the timer is reset. The timer is started again when it is recognized in the hand over decision process that the mobile station is again situated in the radio coverage domain of the micro cell. This case is shown in the exemplary embodiment of FIG. 6. For example, this can be a matter of the scenario in a large city wherein corresponding circuitous routes must be traveled in order to arrive at the destination, whereby the city center is additionally covered by a micro cell. As stated in the abovedescribed exemplary embodiments, a mobile station MS initially situated outside the micro cell is also allocated to the macro cell having the base station $BS_{Macro}$ here and sets up a call therein. The mobile station travels into the radio coverage domain of the micro cell having the base station $BS_M$ at point b and the hand over decision process starts the timer $T_{HO}$. The mobile station MS leaves the radio coverage domain of the micro cell at point c before the timer $T_{HO}$ has run down. The timer $T_{HO}$ is stopped, and reset, since the mobile station MS is no longer situated in the radio coverage domain of the micro cell having the base station $BS_M$. The mobile station MS remains allocated to the macro cell having the base station $BS_{Macro}$. At point d, the mobile station MS again reaches the radio coverage domain of the micro cell and, in response thereto, the hand over decision process restarts the timer $T_{HO}$. Since the mobile station is still located in the radio coverage domain of the micro cell with the base station $B_{SM}$ in point e and the timer $T_{HO}$ has run down, the hand over decision process requests a hand over for the mobile station MS into the micro cell. At point f, which is likewise also located within the micro cell, the mobile station MS ends the call and proceeds into an idle mode.

The method can also be applied when a mobile station is allocated to the base station of a micro cell of a hierarchic cell structure and travels toward an adjoining micro cell. When the mobile station moves slowly toward the adjoining micro cell, then a hand over into the adjoining micro cell is requested for the mobile station with this procedure; when, by contrast, it moves rapidly, then a hand over into the macro cell lying thereabove is requested for it. Such a version is shown in FIG. 7, wherein a slow mobile station sets up a call in a micro cell and approaches an adjoining micro cell at high speed, travels there into and leaves the adjoining micro cell after a short time. In detail, this has the appearance that a slow mobile station MS at the point a within the left-hand micro cell having the base station $BS_{Ma}$ is allocated to this micro cell and sets up a call. In the region of point b, the mobile station MS increases its speed. The mobile station MS which is now a fast mobile station MS reaches the coverage domain of the adjoining micro cell having the base station $BS_{Mb}$ at point c, whereupon the timer $T_{HO}$ is started in the hand over decision process. The fast mobile station MS leaves the radio coverage domain of the original micro cell having the base station $BS_{Ma}$ at point d. The timer $T_{HO}$ has not yet run down at this point in time and a hand over into the micro cell having the base station $BS_{Mb}$ adjoining at the right is therefore not requested by the hand over decision process. Since the mobile station, however, is departing the original radio coverage domain, the hand over decision process determines on the basis of the measured data from the mobile station and/or base station $BS_{Ma}$ that the connection between the mobile station MS and base station $BS_{Ma}$ of the left-hand micro cell has become too poor in quality or that the level is too low or that the distance has become too great and therefore requests a hand over into the macro cell lying thereabove on the basis of static decisions. The hand over into the macro cell has been successfully implemented at the neighboring point e. The timer $T_{HO}$ is stopped and reset with the successful implementation of the hand over. Since the mobile station MS is still located in the radio coverage domain of the right-hand micro cell having the base station $BS_{Mb}$, the timer $T_{HO}$ is started again. The fast mobile station MS leaves the micro cell having the base station $BS_{Mb}$ at point f before the timer $T_{HO}$ runs down. The timer $T_{HO}$ is therefore stopped, reset and not started again. The mobile station MS ends the call in the macro cell (point g) and proceeds into the idle mode.

A monitoring timer TR can be introduced between the resetting and the restarting of the timer $T_{HO}$ for one and the same call. The monitoring timer TR is started when the timer is reset and the timer can only be started again after the expiration of the monitoring timer in case the mobile station is located in the radio coverage domain of a cell. Timer $T_{HO}$ and monitoring timer TR can also be implemented as counters. Since a plurality of micro cells can adjoin a micro cell, one timer is administered per neighboring cell. All neighboring cells are thus co-involved in the hand over decision process. Various possibilities can be established in view of the administration of timer and additional monitoring timer;. Timer and monitoring timer can monitor both the uplink as well as the downlink given duplex systems or can also monitor only the downlink or only the uplink. The starting values of the timer and monitoring timer can be identical in the uplink and downlink or can also be different. Further, they can be occupied with starting values by a remote unit (for example, operation and maintenance).

A numerical example shall also be recited below in order to make the relationship between the hand over decision and the vehicle speed clear. A hierarchic cell structure is thereby considered, composed of a macro cell and of a micro cell having a size of 500 m. A mobile station having an average speed of 10 km/h requires approximately 180 s for traversing the micro cell. When the mobile station has an average speed of 30 km/h, then it requires approximately 60 s and a mobile station having a speed of approximately 60 km/h traverses the micro cell in 30 seconds.

Assuming a time interval of 60 seconds associated with the timer administered for this micro cell, mobile stations, allocated tot he macro cell, that travel into the micro cell at a speed less than 30 km/h will request a hand over into this micro cell. Correspondingly, mobile stations, traversing the micro cell at a speed greater than 30 km/h will remain served by the macro cell, i.e., these mobile stations will not request a hand over into this micro cell.

The functional behavior of the hand over decision process for fast and slow mobile stations can be exemplified with reference to FIGS. 8 and 9 showing a simplified implementation of the process in a GSM system.

In FIG. 8, the received level of a mobile station is outlined as a function of the distance from the base station of a macro cell and that of a micro cell contained in the macro cell. RXLEV DL MACRO thereby denotes the received level at the mobile station from the macro cell and RXLEV_DL_MICRO denotes that from the micro cell. Further, the minimum received level RXLEV_MIN that a mobile station must receive from a base station in order to set up a connection to the appertaining base station is entered in FIG. 8.

FIG. 9 shows the curve of a quantity calculated from the received levels RXLEV_DL_MACRO, RXLEV_DL_MICRO and further variables. This quantity is referred to as power budget (PBGT) and indicates the relative level to the neighboring cell (here, the micro cell from the point of view of the macro cell). When the PBGT is greater than zero, then the radio coverage of the neighboring cell (micro cell) is better than that of the current (macro cell) base station.

In this example the power budget is given by:

$$PBGT = RXLEV\_DL\_MICRO - RXLEV\_DL\_MACRO + MS\_TXPWR\_MACRO - MS\_TXPWR\_MICRO.$$

MS_TXPWR_MACRO denotes the maximum allowed transmission power of the mobile station in the macro cell.

MS_TXPWR_MICRO denotes the maximum allowed transmission power of the mobile station in the micro cell.

In the mobile speed sensitive hand over decision process described above, a mobile station, allocated to the base station of the macro cell, is considered to have entered the coverage area of the micro cell, if the following relations are simultaneously fulfilled.

$$RXLEV\_DL\_MICRO > RXLEV\_MIN \quad (1)$$

$$PBGT > HO\_MARGIN. \quad (2)$$

By adjusting the threshold HO_MARGIN it is possible to define an appropriate micro cell border.

On crossing the micro cell border (relations (1) and (2) are fulfilled) by the mobile station, the hand over process starts the timer for this micro cell. During the associated time interval set in accordance with a predefined threshold for the speed of the mobile station in the micro cell, a check is continuously carried out whether conditions (1) and (2) are simultaneously fulfilled. If any one of these conditions fails, the timer is reset. The timer is restarted when it is found that both conditions are met again.

When it is found that the timer exceeds the associated time interval and the conditions (1) and (2) are still satisfied, then a hand over for this "slow" mobile station into the micro cell is requested by the hand over decision process. When, by contrast, it is found that the mobile station has left the coverage area of the micro cell (condition (1) and/or (2) are/is not satisfied) before the timer has exceeded this time interval, then the hand over decision process does not request a hand over for this "fast" mobile station into this micro cell.

Consider now FIG. 9 for a mobile station approaching the micro cell. After the mobile station has reached the cell boundary of the micro cell (at point S condition (1) is fulfilled, at point T condition (2) is simultaneously fulfilled with condition (1)), the timer for this micro cell is started. It is assumed that at point A the timer exceeds the time interval specified by the system operator for this micro cell. Since at this point both conditions are fulfilled, the hand over decision process requests and performs a hand over into the micro cell for this apparently slow moving mobile station. When, by contrast, a mobile station moves at a speed such that within this time interval the mobile station covers the distance from point T (where the timer has been started) to point B, the hand over decision process determines this mobile station as fast, and consequently a hand over into the micro cell is not requested. In fact, at point Q condition (1) fails and as a result the timer has been reset.

It should be pointed out that for each mobile station allocated to the macro cell a separate timer is administered for each underlaid micro cell. This means, when the mobile station is located in the overlap area of two micro cells, two timers are running.

The same principle of a mobile speed sensitive hand over decision making is applied when a mobile station is allocated tot he base station of a micro cell and approaches an adjoining micro cell. A different timer is used for each neighboring micro cell. The time interval associated with each neighboring micro cell is chosen such that for a mobile station moving slowly from the current micro cell into an adjoining micro cell a hand over into this adjoining micro cell is requested and performed by the hand over method of the present invention. Correspondingly, for a mobile station moving rapidly out of the current micro cell and entering an adjoining micro cell, a hand over into the overlying macro cell is requested and performed by the hand over method.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A mobile speed sensitive hand over decision method in a mobile radio network with hierarchical cell structure, composed of macro cells and micro cells, said method requesting and performing a hand over from a macro cell into an underlaid micro cell for a mobile telephone subscriber allocated to a base station of said macro cell and moving slowly through a coverage area of said micro cells, and not requesting a hand over if said mobile telephone subscriber moves rapidly through the coverage area of said micro cells, said mobile speed sensitive hand over decision method comprising the steps of:

comparing at least one of measured data and quantities derived from the measured data, calculated by at least one of said mobile station and the base station of said macro cell, to thresholds, to determine whether the mobile station is located in or is approaching the coverage domain of at least one of said micro cells;

starting a separate timer for each micro cell, when the mobile station is within the coverage domain of that micro cell;

continuously comparing the timer associated with each micro cell with an arbitrary but anticipated time interval related to each micro cell in accordance with a vehicle speed of said mobile station; and requesting and performing a hand over for said mobile station from said macro cell into an underlaid micro cell when the associated timer exceeds said time interval and the mobile station is still located in the coverage domain of said underlaid micro cell.

2. The mobile speed sensitive hand over method as claimed in claim 1, wherein the method further includes the step of:

continuously carrying out a check whether said mobile station is still located in the coverage domain of any micro cell for which a timer has been started, resetting the timer associated with a respective micro cell when said mobile station has left the coverage domain of the respective micro cell, and restarting the timer again when said mobile station is again located in the coverage domain of the respective micro cell.

3. The mobile speed sensitive hand over method as claimed in claim 2, wherein the method further includes the step of:

providing for each timer a monitoring timer, said monitoring timer being started when the corresponding timer is reset, the corresponding timer only being restarted after a rundown of said monitoring timer.

4. The mobile speed sensitive hand over method according to claim 3, wherein at least one of the timer and monitoring timer are counters.

5. A mobile speed sensitive hand over decision method in a mobile radio network with hierarchical cell structure, composed of macro cells and micro cells, said method requesting and performing a hand over from a macro cell into an underlaid micro cell for a mobile telephone subscriber allocated to a base station of said macro cell and moving slowly through a coverage area of said micro cells, and not requesting a hand over if said mobile telephone subscriber moves rapidly through the coverage area of said micro cells, said mobile speed sensitive hand over decision method comprising the steps of:

comparing at least one of measured data and quantities derived from the measured data, calculated by at least one of said mobile station and the base station of said macro cell, to thresholds, to determine whether the mobile station is located in or is approaching the coverage domain of at least one of said micro cells;

starting a separate timer for each micro cell, when the mobile station is within the coverage domain of that micro cell;

continuously carrying out a check whether said mobile station is still located in the coverage domain of any micro cell for which a timer has been started, resetting the timer associated with a respective micro cell when said mobile station has left the coverage domain of the respective micro cell, and restarting the timer again when that said mobile station is again located in the coverage domain of the respective micro cell;

continuously comparing the timer associated with each micro cell with an arbitrary but anticipated time interval related to each micro cell in accordance with a vehicle speed of said mobile station; and requesting and performing a hand over for said mobile station from said macro cell into an underlaid micro cell when the associated timer exceeds said time interval and the mobile station is still located in the coverage domain of said underlaid micro cell.

6. The mobile speed sensitive hand over method according to claim 5, wherein at least one of the timer and monitoring timer are counters.

7. The mobile speed sensitive hand over method as claimed in claim 5, wherein the method further includes the step of:

providing for each timer a monitoring timer, said monitoring timer being started when the corresponding timer is reset, the corresponding timer only being restarted after a rundown of said monitoring timer.

8. A mobile speed sensitive hand over decision method in a mobile radio network with hierarchical cell structure, composed of macro cells and micro cells; said method requesting and performing a hand over for a mobile telephone subscriber allocated to the base station of a micro cell either from said micro cell into an adjoining micro cell when said mobile telephone subscriber moves slowly through a coverage area of said adjoining micro cell, or from said micro cell into the overlying macro cell when said mobile telephone subscriber moves rapidly through the coverage area of at least one adjoining micro cell, said mobile speed sensitive hand over decision method comprising the steps of:

comparing at least one of measured data and quantities derived from the measured data, calculated by at least one of the mobile station and the base station of a serving micro cell, to thresholds, to determine whether the mobile station is located in or is approaching the coverage domain of at lest one adjoining micro cell;

starting a separate timer for each adjoining micro cell, when the mobile station is within the coverage domain of that adjoining micro cell;

continuously carrying out a check whether said mobile station is still located in the coverage domain of any adjoining micro cell for which the timer has been started, resetting the timer associated to the adjoining micro cell when said mobile station has left the coverage domain of that adjoining micro cell, and restarting the timer again when said mobile station is again located in the coverage domain of that adjoining micro cell;

continuously comparing the timer associated with each adjoining micro cell with an arbitrary but anticipated time interval related to each adjoining micro cell in accordance with a vehicle speed of said mobile station;

requesting and performing a hand over for said mobile station from said micro cell into an adjoining micro cell when the associated timer exceeds said time interval and the mobile station is still located in the coverage domain of said adjoining micro cell; and requesting and performing a hand over for said mobile station form said micro cell into an overlying macro cell, before any timer associated with an adjoining micro cell has exceeded the corresponding time interval, and when the connection between said mobile station and the base station of said micro cell cannot be maintained at a predetermined quality of a call in progress or when there is not an adjoining micro cell.

9. The mobile speed sensitive hand over method as claimed in claim 8, wherein the method further includes the step of:

providing for each timer a monitoring timer, said monitoring timer being started when the corresponding timer is reset, the corresponding timer only being restarted after a rundown of said monitoring timer.

10. A method for use in a mobile radio network having a plurality of base stations in spatial arrangement according to a cellular system in a hierarchic cell structure, composed of a macro cell and of at least one micro cell, comprising the steps of:

handing over from a radio coverage domain of a macro cell into a radio coverage domain of at least one micro cell that takes into consideration a speed of a mobile station of a mobile radio telephone subscriber in addition to static hand over decisions;

comparing measured data, calculated by at least one of the mobile station and a base station, to thresholds;

determining for the mobile station allocated to the base station of the macro cell in the hand over decision process whether the mobile station is located in or is approaching the radio coverage domain of a respective micro cell contained in the macro cell;

starting an internal timer with a fixed time interval, when the mobile station is located in or is approaching the radio coverage domain of the respective micro cell contained in the macro cell, and continuously determining on the basis of data entering in the hand over decision process if the mobile station is still located in the radio coverage domain of the respective micro cell;

requesting, after expiration of the time interval, a hand over for the appertaining mobile station into the respective micro cell only when the mobile station is still located in the radio coverage domain of the micro cell; and providing a monitoring timer between the starting of the internal timer and a restarting of the internal timer for a common connection, said monitoring timer being started when the internal timer is reset, the internal timer being only restarted after a run-down of the monitoring timer when the mobile station is located in the radio coverage domain of the respective micro cell.

11. The method according to claim 10, wherein a respective timer interval to be set forms a measure for an anticipated dwell time of the mobile station in the micro cell in accord with a vehicle speed of the mobile station.

12. A mobile speed sensitive hand over decision method in a mobile radio network with hierarchical cell structure, composed of macro cells and micro cells, said method requesting and performing a hand over from a macro cell into an underlaid micro cell for a mobile telephone subscriber allocated to a base station of said macro cell and moving slowly through a coverage area of said micro cells, and not requesting a hand over if said mobile telephone subscriber moves rapidly through the coverage area of said micro cells, said mobile speed sensitive hand over decision method comprising the steps of:

comparing at least one of measured data and quantities derived from the measured data, calculated by at least one of said mobile station and the base station of said macro cell, to thresholds, to determine whether the mobile station is located in or is approaching the coverage domain of at least one of said micro cells;

starting a separate timer for each micro cell, when the mobile station is within the coverage domain of that micro cell;

continuously carrying out a check whether said mobile station is still located in the coverage domain of any micro cell for which a timer has been started, resetting the timer associated with a respective micro cell when it is found that said mobile station has left the cover domain of the respective micro cell, and restarting the timer again when said mobile station is again located in the coverage domain of the respective micro cell;

providing for each timer a monitoring timer, said monitoring timer being started when the corresponding timer is reset, the corresponding timer only being restarted after a rundown of said monitoring timer;

continuously comparing the timer associated with each micro cell with an arbitrary but anticipated time interval related to each micro cell in accordance with a vehicle speed of said mobile station; and requesting and performing a hand over for said mobile station from said macro cell into an underlaid micro cell when the associated timer exceeds said time interval and the mobile station is still located in the coverage domain of said underlaid micro cell.

13. A mobile speed sensitive hand over decision method in a mobile radio network with hierarchical cell structure, composed of macro cells and micro cells; said method requesting and performing a hand over for a mobile telephone subscriber allocated to the base station of a micro cell either from said micro cell into an adjoining micro cell when said mobile telephone subscriber moves slowly through a coverage area of said adjoining micro cell, or from said micro cell into the overlying macro cell when said mobile telephone subscriber moves rapidly through the coverage area of said adjoining micro cell, said mobile speed sensitive hand over decision method comprising the steps of:

comparing at least one of measured data and quantities derived from the measured data, calculated by at least one of the mobile station and the base station of a serving micro cell, to thresholds, to determine whether the mobile station is located in or is approaching the coverage domain of at lest one adjoining micro cell;

starting a separate timer for each adjoining micro cell, when the mobile station is within the coverage domain of that adjoining micro cell;

continuously carrying out a check whether said mobile station is still located in the coverage domain of any adjoining micro cell for which the timer has been started, resetting the timer associated to the adjoining micro cell when said mobile station has left the coverage domain of that adjoining micro cell, and restarting the timer again when said mobile station is again located in the coverage domain of that adjoining micro cell;

providing for each timer a monitoring timer, said monitoring timer being started when the corresponding timer is reset, the corresponding timer only being restarted after a rundown of said monitoring timer;

continuously comparing the timer associated with each adjoining micro cell with an arbitrary but anticipated time interval related to each adjoining micro cell in accordance with a vehicle speed of said mobile station;

requesting and performing a hand over for said mobile station from said micro cell into an adjoining micro cell when the associated timer exceeds said time interval and the mobile station is still located in the coverage domain of said adjoining micro cell; and requesting and performing a hand over for said mobile station form said micro cell into an overlying macro cell, before any timer associated with an adjoining micro cell has exceeded the corresponding time interval, and when the connection between said mobile station and the base station of said micro cell cannot be maintained at a predetermined quality of a call in progress or when there is not an adjoining micro cell.

* * * * *